United States Patent
Kullar

(10) Patent No.: US 11,027,333 B2
(45) Date of Patent: Jun. 8, 2021

(54) LIQUID-RESISTANT DIRECT-DRIVE ROBOTIC LADLER

(71) Applicant: Sukhjinder Kullar, Beavercreek, OH (US)

(72) Inventor: Sukhjinder Kullar, Beavercreek, OH (US)

( * ) Notice: Subject to any disclaimer, the term of this patent is extended or adjusted under 35 U.S.C. 154(b) by 208 days.

(21) Appl. No.: 16/362,101

(22) Filed: Mar. 22, 2019

(65) Prior Publication Data

US 2020/0298306 A1  Sep. 24, 2020

(51) Int. Cl.
  B22D 39/02  (2006.01)
  F16H 1/14  (2006.01)
  B25J 19/00  (2006.01)
  B25J 15/00  (2006.01)
  B25J 9/10  (2006.01)

(52) U.S. Cl.
  CPC ............ B22D 39/026 (2013.01); B25J 9/102 (2013.01); B25J 15/0019 (2013.01); B25J 19/0075 (2013.01); F16H 1/14 (2013.01)

(58) Field of Classification Search
  CPC .... B22D 17/30; B22D 39/026; B25J 15/0019; B25J 19/0075; B25J 9/102; F16H 1/14; F16H 57/0495
  USPC ....... 222/629, 591, 164, 167, 617, 604, 590; 266/236, 275; 164/336, 136
  See application file for complete search history.

(56) References Cited

U.S. PATENT DOCUMENTS

| | | | | |
|---|---|---|---|---|
| 3,398,782 A * | 8/1968 | Lauterjung | .......... | B22D 39/026 164/336 |
| 4,074,837 A * | 2/1978 | Engel | .................. | B22D 39/026 164/336 |
| 4,353,406 A * | 10/1982 | Gaddi | .................... | B22D 39/02 164/336 |
| 5,131,452 A * | 7/1992 | Bilz | ........................ | B22D 39/02 164/136 |
| 7,021,361 B2 * | 4/2006 | Hara | .................... | B22D 39/026 164/136 |
| 9,188,390 B2 * | 11/2015 | Yu | ........................ | C22B 21/0084 |
| 2005/0023737 A1 * | 2/2005 | Takahashi | ............... | C21C 7/072 266/217 |
| 2008/0083792 A1 * | 4/2008 | Nishimatsu | .......... | B22D 39/026 222/629 |

* cited by examiner

*Primary Examiner* — Scott R Kastler
*Assistant Examiner* — Michael Aboagye
(74) *Attorney, Agent, or Firm* — Michael J. Gallagher; Luper Neidenthal & Logan

(57) ABSTRACT

A liquid-resistant direct-drive robotic ladler is provided and may include a drive unit generating rotational force, a drive shaft, and a ladling unit containing a ladling shaft. The drive shaft and ladling shafts may engage through bevel gears transmitting rotational force. The ladling unit may have a plurality of external openings, with each opening sealed with sealing plates. In some embodiments, each sealing plate overlaps the ladling unit casing external openings at all points of contact in an orthogonal, relative to a width-wise plane of the sealing plate. width greater than a thickness of the sealing plate. The direct-drive mechanism, employing closely matched gears, allows high accuracy pouring. In some embodiments, the drive shaft bevel gear is coupled to the ladling shaft bevel gear with a backlash equal to or less than 0.008 inches. The ladler may be at least partially immersible or submersible in liquids, including high-temperature liquid metals.

19 Claims, 3 Drawing Sheets

LIQUID-RESISTANT DIRECT-DRIVE ROBOTIC LADLER

CROSS-REFERENCE TO RELATED APPLICATIONS

None.

STATEMENT REGARDING FEDERALLY SPONSORED RESEARCH OR DEVELOPMENT

Not applicable.

TECHNICAL FIELD

The present invention relates to a direct-drive robotic ladler. In particular, the ladler described here may be a system allowing a robotic ladler, having a high degree of precision operation, to be immersed for certain periods of time in liquids, particularly in high temperature liquified metal.

BACKGROUND OF THE INVENTION

The present invention relates to ladle systems for ladling and pouring molten metal. More particularly, the present invention discloses robotic ladle systems for supplying metered amounts of metal for use with die casting machines. Particularly, and in non-limiting embodiments, the systems allow for a substantial portion of the system to be immersible in high-temperature liquids, including some molten metals.

Die casting is a metal casting process that is characterized by forcing molten metal under high pressure into a mold cavity. The mold cavity is created using two hardened tool steel dies which have been machined into shape and work similarly to an injection mold during the process. Most die castings are made from non-ferrous metals, specifically zinc, copper, aluminum, magnesium, lead, pewter, and tin-based alloys. Depending on the type of metal being cast, a hot- or cold-chamber machine may be used.

The casting equipment and the metal dies represent large capital costs, and this tends to limit the process to high-volume production. Such high-volume production requirements militate in favor of a partially or fully-automated process, to the extent possible. Manufacture of parts using die casting is relatively simple, involving only four main steps, which keeps the incremental cost per item low. It is especially suited for a large quantity of small- to medium-sized castings, which is why die casting produces more castings than most other casting processes. Die castings are characterized by a very good surface finish, by casting standards, and dimensional consistency.

Die casting machines typically employ a plunger system operating within a hollow shot sleeve in the machine for forcing molten metal under high pressure into a die. As the metal cools, a casting will be formed. For proper operation the hollow shot sleeve must be filled with a metered amount of molten metal. Excess metal which is not required to fill the casting is confined in the shot sleeve in front of the plunger and subsequently solidifies to form a short cylinder known as a "biscuit". For proper operation, the shot sleeve and other die components must be subjected to the high temperature metal for minimal periods of time during each casting cycle to prevent unnecessary component deterioration.

Although molten metal may be supplied to the die casting machine manually, it is known in the art to provide automatic ladle apparatus. However, known prior art machines suffer from several disadvantages. During die casting it is necessary to pour molten metal into the shot sleeve of the die casting machine through a small pour hole provided for this purpose. Machines which are inaccurate tend to splash or waste metal. Dies that are over-filled or under-filled can result in costly re-melts and production inefficiencies. In some cases, because the pour point may be subject to variation, the use of a funnel or trough for directing the molten metal may be required. Molten metal is often wasted when sudden ladle movements cause spilling or sloshing.

Prior art automatic ladle systems typically misfunction in response to moderate variation in metal bath level during the filling operation. This results in an increase in labor costs since the metal holding furnace must be refilled constantly with such troublesome machines. In the prior art, ladle immersion control systems have employed level detectors usually including probes which lower into molten metal. As the probes are immersed in the molten metal an electrical circuit is completed triggering a down travel stop mechanism. With construction of this type molten metal often builds up on the probe and high temperatures can destroy insulation, break wires, and otherwise injure the apparatus.

Ladlers are also susceptible to the high temperature environment in which they are forced to operate. Traditionally, most components are relatively exposed, with only the ladle being specially treated to withstand high temperatures, or to be immersed in high-temperature liquid metals.

Because of their commonly found mechanical drive trains, many ladlers also have problems performing in an exactly repeatable manner. In many previously known apparatuses, sprocket chains ride over chain wheels are used, either to move a sliding carriage along a traverse bar or to hold a supporting arm of the ladle in a constantly vertical position while the swivel arm is moved. These drive chains or control chains have the essential disadvantage that, in particular due to their construction and as a result of being heated, they are subject to changes of length which are undesirable and uncontrollable, and thus also cannot be compensated. The positioning of the casting ladle when pouring the molten metal into the pouring funnel of a machine or casting mold can be inexact, and in some designs the supporting arm of the casting ladle does not always take up exactly the same position on filling, which is the only guarantee that the amount of molten metal scooped up by the ladle is always the same. The heating of the chains, which are relatively easily subject to changes of length, results from their proximity to the crucible containing the molten metal, from which a considerable amount of heat is radiated.

A further disadvantage of these machines is that numerous drive and control components are arranged or mounted in such a way that every time the ladle scoops up a measured quantity of molten metal, they are moved over the crucible or into its vicinity, where they are exposed to intensive, direct heat radiation. As well, molten metal which may splash on the chains or other exposed parts of the ladler can cause immediate part failure or production inaccuracy.

The present system, in a variety of embodiments, solves many of these long-standing problems and provide a liquid-resistant, sealable, direct-drive robotic ladler that may be safely at least partially immersed in some molten metals for a period of time, and which, due to its high-precision mechanical functions, is capable of very high-accuracy and repeatable ladling.

SUMMARY OF THE INVENTION

A direct-drive robotic ladler may include several main components, including a drive unit capable of generating rotational force, a drive shaft, and a ladling unit containing a ladling shaft. The drive shaft and ladling shafts may engage through matched bevel gears. The drive train of the system may be expressed that the drive shaft bevel gear engages the ladling shaft bevel gear, and accordingly rotational force generated by the drive unit is mechanically transmitted to the drive shaft and thence to the ladling shaft.

Various shaft bearings may be employed help damp minor translational and lateral movements of the various shafts. There may be a ladling unit casing as part of the ladling unit that has a plurality of external openings, with each opening sealed by a sealing plate. In some embodiments, each sealing plate overlaps the ladling unit casing external openings at all points of contact in an orthogonal, relative to a width-wise plane of the sealing plate, width greater than a thickness of the sealing plate. An extended overlapping area between the joining of the ladling casing external openings and the sealing plates that close them is intended to minimize the chances that molten metal, in some embodiments, may leak through the joint into, and thereby damage, the inner workings of the ladling unit. While the plates are intended to be quite tight, it is possible, even possible by capillary action, for a small amount of liquid metal to flow between the ladling unit casing and a corresponding sealing plate. Having an extended area of overlap allows the relatively cooler mass of the ladling unit casing to cause such liquid metal to solidify before it can fully enter the ladling unit casing. Such hardened flash thereby does not damage the unit and can be easily removed during routine maintenance.

The direct-drive mechanism, employing matched bevel gears, is intended for high accuracy pouring. In some embodiments, the drive shaft bevel gear may be coupled to the ladling shaft bevel gear with a backlash equal to or less than 0.008 inches, while in yet other embodiments, the drive shaft bevel gear may be coupled to the ladling shaft bevel gear with a backlash equal to or less than 0.012 inches.

For the various reasons discussed above, in many embodiments, the ladler may be at least partially immersible in liquids. This is in contrast to many prior art ladlers, where the only part that is immersible may be a refractory-material ladle itself. It has been found that in some embodiments, the ladling unit is immersible in liquids at or above 660 degrees Celsius, for at least a commercially feasible time. This particular temperature specification has shown to be sufficient for the ladling unit to be immersible in liquid aluminum, which has a melting point of 660° Celsius. In other embodiments, the ladling unit may be immersible in liquids at 750 degrees Celsius. In some embodiments, the certain components of the system, such as the ladling unit, drive shaft and shaft casing, and perhaps others, may be fully submersible. In one particular embodiment, the ladling unit may be fully submersible in liquids at or above 660 degrees Celsius.

Figure 1:
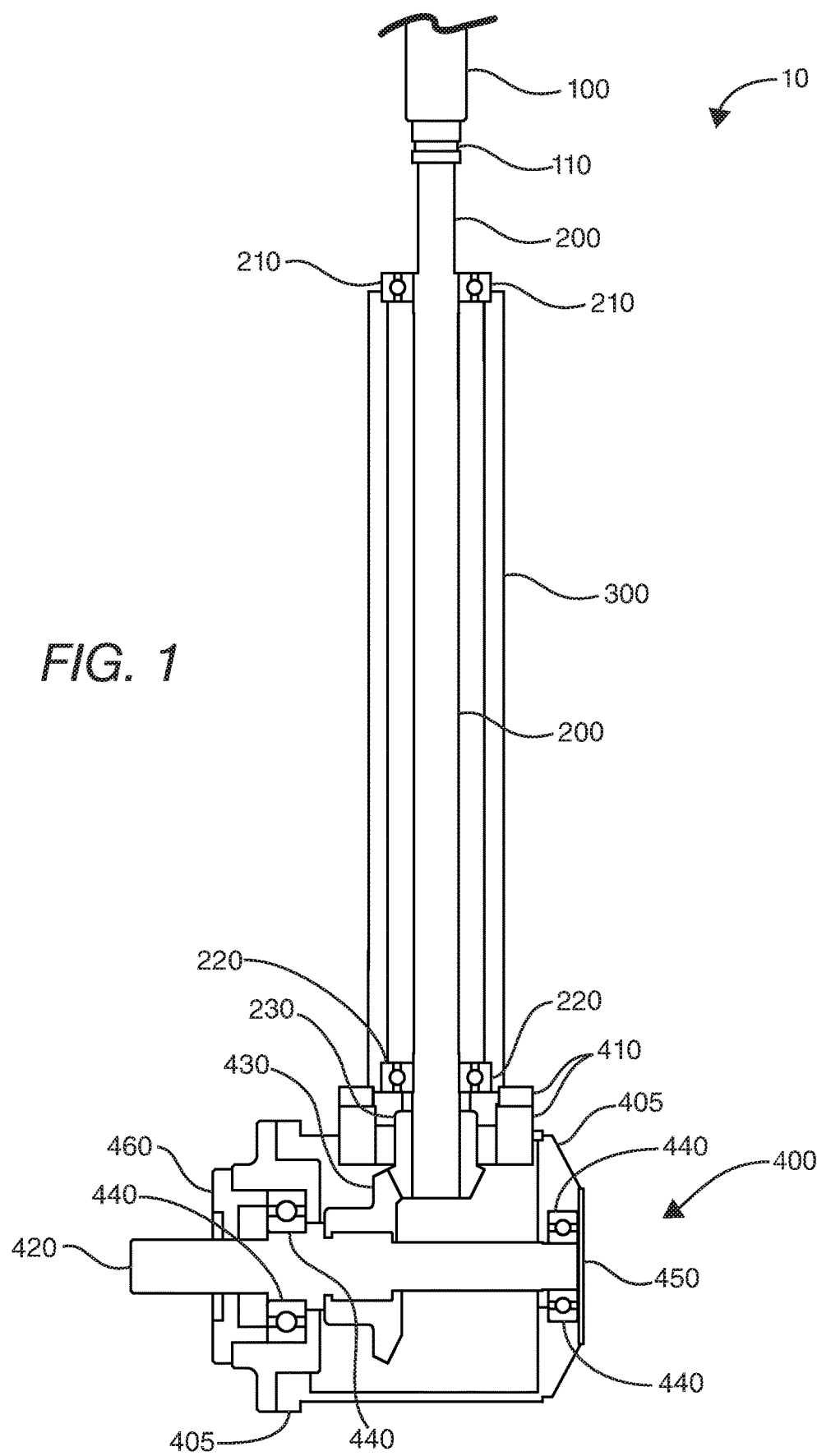
FIG. 1 shows a vertical cross-section view of an embodiment of a direct-drive robotic ladler.

These illustrations are provided to assist in the understanding of the exemplary embodiments of a direct-drive robotic ladler and materials related thereto described in more detail below and should not be construed as unduly limiting the specification. In particular, the relative spacing, positioning, sizing and dimensions of the various elements illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

Figure 2:
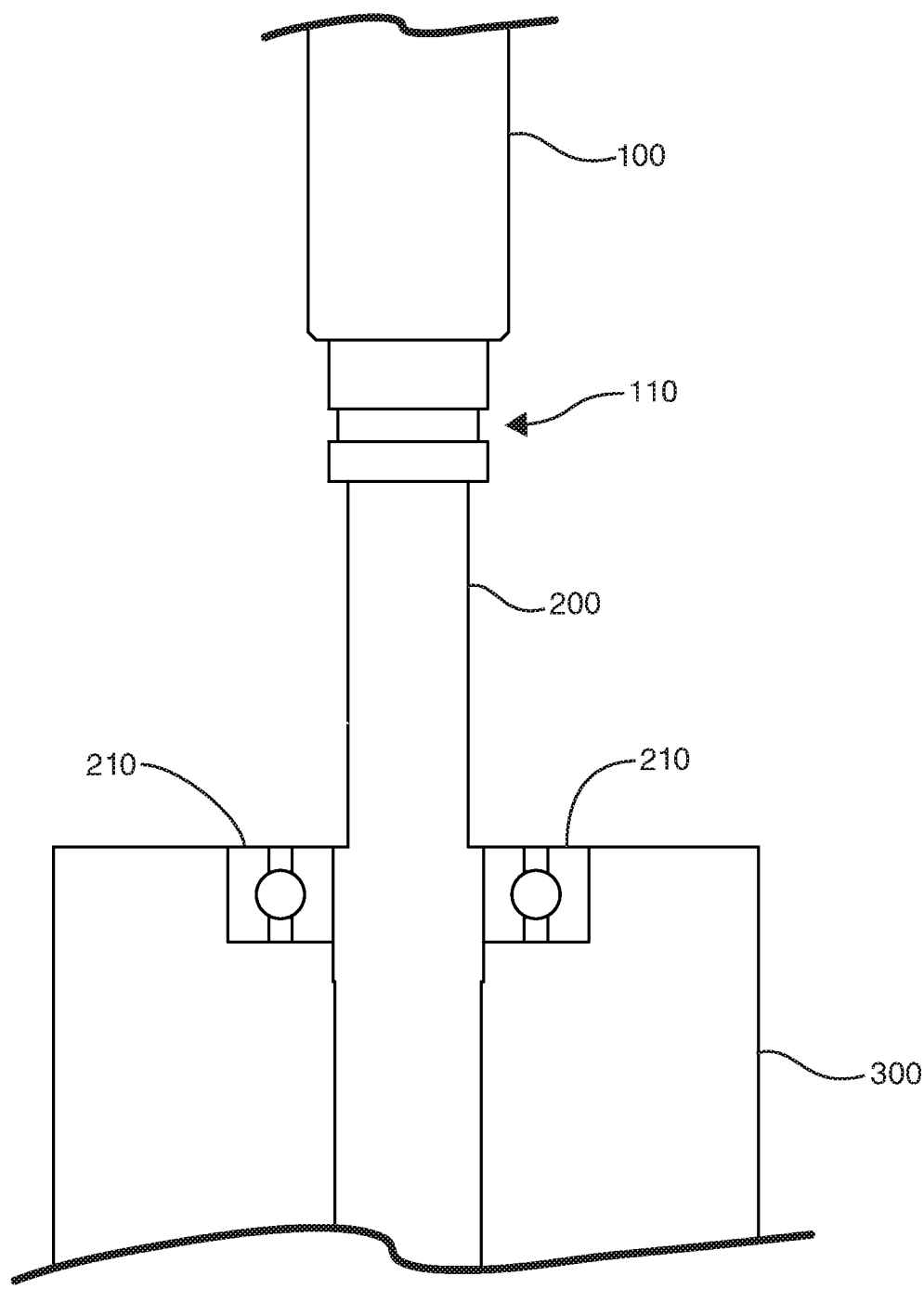
FIG. 2 shows a vertical cross-section view of an upper portion of the embodiment of FIG. 1.
Figure 3:
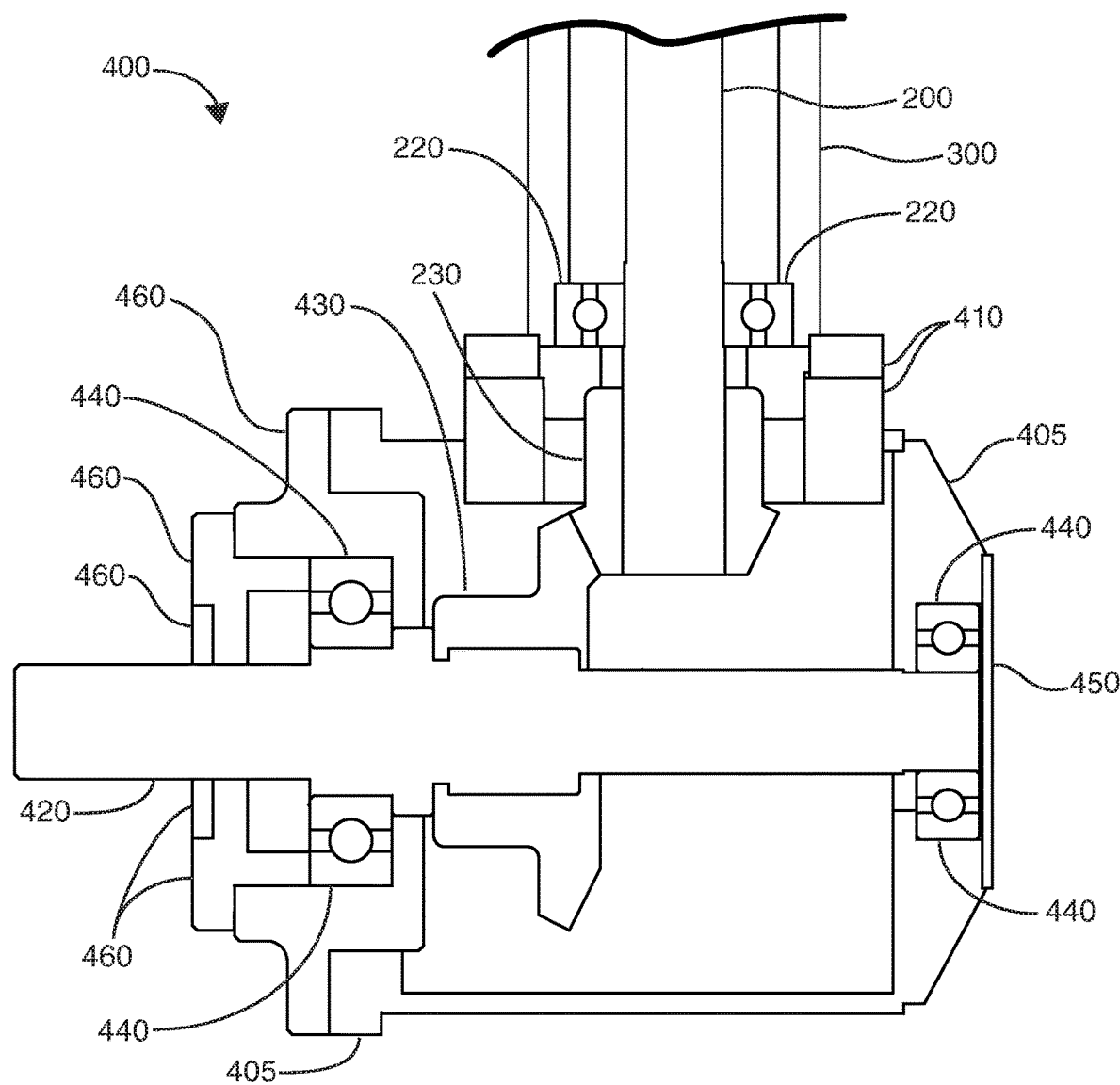
FIG. 3 shows a vertical cross-section view of a lower portion of the embodiment of FIG. 1.

As seen well in FIGS. 1-3, a direct-drive robotic ladler is seen in various embodiments. For the purposes of this specification, aspects of certain components will be described as "proximal" or "distal" with reference to being near to, or farther from, the ultimate point of ladling. Therefore, by way of example and not limitation, as seen in FIG. 1, the drive shaft (200) may have a distal aspect near its attachment to the drive unit (100) and a proximal aspect near its attachment to the ladling unit (400). Similarly, and also as seen well in FIG. 1, the ladling shaft (420) may have a distal aspect near an end of the ladling shaft (420) most distant from the ladle (not shown) and near the distal ladling unit sealing plate (450), and also a proximal aspect near the ladle (not shown) and near the proximal ladling unit sealing plate (460). One skilled in the art will realize that a wide variety of known ladles may be attached to the ladling shaft (420) at or near its proximal end.

What is claimed then, as seen in FIGS. 1-3, is a direct-drive robotic ladler (10) that includes, by way of example and not limitation, a number of components that may include, as seen well in FIGS. 1-2, a drive unit (100) capable of generating rotational force. The drive unit (100) may be of any type that can provide rotational force, and is often, but not exclusively, intended to the seventh axis modality of a robotic system. The drive unit (100) may be coupled to a drive shaft (200), at least partially enclosed in a shaft casing (300), that is, in turn, coupled to a drive shaft bevel gear (230).

As seen well in FIGS. 1 and 3, a ladling unit (400) having a ladling shaft (420) coupled to a ladling shaft bevel gear (430) may be enclosed in a sealable ladling unit casing (405), protecting the drive shaft (200), the ladling shaft (420) and both bevel gears (230, 430). The drive train of the system may be expressed that the drive shaft bevel gear (230) engages the ladling shaft bevel gear (430), and accordingly rotational force generated by the drive unit (100) is mechanically transmitted to the drive shaft (200) and thence to the ladling shaft (420).

As seen well in FIG. 2, the drive unit (100) may coupled to the drive shaft (200) by a flexible drive unit-drive shaft coupler (110). Such a construction may help damp minor translational movements of the drive unit (100) or drive shaft (200). Also, with reference to FIG. 2, the drive shaft (200) may run in at least one upper shaft bearing (210) coupled to the shaft casing (300). Such construction may assist in the stabilization and smooth running of the drive shaft (200). Correspondingly, and as seen well in FIG. 3, the drive shaft (200) may run in at least one lower shaft bearing (220).

Now with reference to FIG. 3, the ladling unit casing (405) is coupled to the shaft casing (300) by at least one shaft casing-ladling unit seal (410). As seen in FIG. 3, but only by way of example and not limitation, the ladling shaft (420) may run in at least one ladling shaft bearing (440).

Further, as seen in FIG. 3, ladling unit casing (405) has a plurality of external openings, wherein each opening is reversibly sealable by a sealing plate. In some embodiments, each sealing plate overlaps the ladling unit casing (405) external openings at all points of contact in an orthogonal, relative to a width-wise plane of the sealing plate, width greater than a thickness of the sealing plate. An extending overlapping area between the ladling casing (405) external openings and the sealing plates that close them is intended to minimize the chances that molten metal, in some embodiments, may leak through the joint into, and thereby damage, the inner workings of the ladling unit (400). While the plates are intended to be quite tight, it is possible, even possible by capillary action, for a small amount of liquid metal to flow between the ladling unit casing (405) and a corresponding sealing plate. Having an extended area of overlap allows the relatively cooler mass of the ladling unit casing (405), relative to the die casting crucible temperature, to cause such liquid metal to solidify before it can fully enter the ladling unit casing (405). Such hardened flash thereby does not damage the unit and can be easily removed during routine maintenance. In various embodiments, such sealing plates may be selected from at least one of a distal ladling unit sealing plate (450) and a proximal ladling unit sealing plate (460).

The direct-drive mechanism, employing matched bevel gears, is intended for high accuracy pouring. In some embodiments, the drive shaft bevel gear (230) may be coupled to the ladling shaft bevel gear (430) with a backlash equal to or less than 0.008 inches, while in yet other embodiments, the drive shaft bevel gear (230) may be coupled to the ladling shaft bevel gear (430) with a backlash equal to or less than 0.012 inches. While FIGS. 1-3 show the engagement of the drive shaft bevel gear (230) and the ladling shaft bevel gear (430) in an orthogonal manner, it is particularly noted that such is not necessarily the case. The gears may engage at any angle that allows the functional transmission of rotational force between the gears (230, 430). Further, it is noted that throughout this specification, in reference to the gears (230, 430), the terms "coupled to," "engagement," and "engage" shall have identical meanings, and that only a reversible mechanical linkage, and no permanent attachment, is intended.

For the various reasons discussed above, in many embodiments, the ladler (10) may be at least partially immersible in liquids. This is in contrast to many prior art ladlers, where the only part that is immersible may be a refractory-material ladle itself. It has been found that in some embodiments, the ladling unit (400) is at least partially immersible in liquids at or above 660 degrees Celsius, for at least a commercially feasible time. This particular temperature specification has shown to be sufficient for the ladling unit (400) to be at least partially immersible in liquid aluminum, which has a melting point of 660 degrees Celsius. In other embodiments, the ladling unit (400) may be at least partially immersible in liquids at 750 degrees Celsius. Since one skilled in the art would know that the external components of the ladler (10) may be fabricated from steel or other high-temperature resistant materials, the ladler (10) thus is suitable for at least partial immersion, and again at least for a period of time, in many liquid metals.

In a series of further embodiments, as would be know by one skilled in the art, a direct-drive robotic ladler (10) can include, as described above, a drive unit (100) capable of generating rotational force. This may be coupled to a drive shaft (200) at least partially enclosed in a shaft casing (300), and in turn coupled to a drive shaft bevel gear (230). Some embodiments may have a ladling unit (400) with a ladling shaft (420) coupled to a ladling shaft bevel gear (430), enclosed in a sealable ladling unit casing (405) having a plurality of external openings, where each opening is reversibly sealable by a sealing plate. In a particular set of embodiments, the drive shaft bevel gear (230) may engage the ladling shaft bevel gear (430) with a backlash equal to or less than 0.008 inches. Thus, rotational force generated by the drive unit (100) is mechanically transmitted to the drive shaft (200) and thence to the ladling shaft (420).

In some other embodiments, the device just described may be formed such that each sealing plate overlaps the ladling unit casing (405) external openings at all points of contact in an orthogonal, relative to a width-wise plane of the sealing plate, width greater than a thickness of the sealing plate.

In yet another series of embodiments, by way of example and not limitation only, a direct-drive robotic ladler (10), can include a drive unit (100), capable of generating rotational force, coupled by a flexible drive unit to drive shaft coupler (110) to a drive shaft (200). The drive shaft (200) may be at least partially enclosed in a shaft casing (300), and may run in at least one upper shaft bearing (210) and at least one lower shaft bearing (220). The drive shaft (200) may further be coupled to a drive shaft bevel gear (230).

Such embodiments can include a ladling unit (400) enclosed in a sealable ladling unit casing (405) having a plurality of external openings, where each opening is reversibly sealable by a sealing plate where each sealing plate overlaps the ladling unit casing (405) at all points of contact in an orthogonal, relative to a width-wise plane of the sealing plate, width greater than a thickness of the sealing plate. The ladling unit casing (405) may be coupled to the shaft casing (300) by at least one shaft casing-ladling unit seal (410), with a ladling shaft (420) running in at least one ladling shaft bearing (440). The ladling shaft (420) may be coupled to a ladling shaft bevel gear (430), such that the drive shaft bevel gear (230) engages the ladling shaft bevel gear (430), and rotational force generated by the drive unit (100) is mechanically transmitted to the drive shaft (200) and thence to the ladling shaft (420).

In other embodiments, the drive shaft bevel gear (230) may be coupled to the ladling shaft bevel gear (430) with a backlash equal to or less than 0.008 inches, while in other embodiments, the drive shaft bevel gear (230) may be coupled to the ladling shaft bevel gear (430) with a backlash equal to or less than 0.012 inches.

The high-temperature liquid resistance of many proposed embodiments has already been discussed. In some embodiments, the ladling unit (400) is at least partially immersible in liquids at or above 660 degrees Celsius, or even possibly higher, subject of course, to the temperature resisting qualities of the material from which the ladler (10) is manufactured.

Numerous alterations, modifications, and variations of the preferred embodiments disclosed herein will be apparent to those skilled in the art and they are all anticipated and contemplated to be within the spirit and scope of the disclosed specification. For example, although specific embodiments have been described in detail, those with skill in the art will understand that the preceding embodiments and variations can be modified to incorporate various types of substitute and or additional or alternative materials, relative arrangement of elements, order of steps and additional steps, and dimensional configurations. Accordingly, even though only few variations of the method and products are described herein, it is to be understood that the practice of such additional modifications and variations and the equivalents thereof, are within the spirit and scope of the method and products as defined in the following claims. The corresponding structures, materials, acts, and equivalents of all means or step plus function elements in the claims below are intended to include any structure, material, or acts for performing the functions in combination with other claimed elements as specifically claimed.

I claim:

1. A direct-drive robotic ladler (10), comprising:
a drive unit (100) capable of generating rotational force, coupled to a drive shaft (200), at least partially enclosed in a shaft casing (300),
coupled to a drive shaft bevel gear (230),
a ladling unit (400) having a ladling shaft (420) coupled to a ladling shaft bevel gear (430), enclosed in a ladling unit casing (405) having a plurality of external openings, wherein each opening is reversibly sealable by a sealing plate, wherein,
the drive shaft bevel gear (230) engages the ladling shaft bevel gear (430), and,
rotational force generated by the drive unit (100) is mechanically transmitted to the drive shaft (200) and thence to the ladling shaft (420).

2. The device according to claim 1, wherein the drive unit (100) is coupled to the drive shaft (200) by a flexible drive unit—drive shaft coupler (110).

3. The device according to claim 1, wherein the drive shaft (200) runs in at least one upper shaft bearing (210) coupled to the shaft casing (300).

4. The device according to claim 1, wherein the drive shaft (200) runs in at least one lower shaft bearing (220).

5. The device according to claim 1, wherein the ladling unit casing (405) is coupled to the shaft casing (300) by at least one shaft casing—ladling unit seal (410).

6. The device according to claim 1, wherein the ladling shaft (420) runs in at least one ladling shaft bearing (440).

7. The device according to claim 1, wherein each sealing plate overlaps the ladling unit casing (405) external openings at all points of contact in an orthogonal, relative to a width-wise plane of said each sealing plate, width greater than a thickness of the sealing plate.

8. The device according to claim 1, wherein the sealing plates are selected from at least one of a distal ladling unit sealing plate (450) and a proximal ladling unit sealing plate (460).

9. The device according to claim 1, wherein the drive shaft bevel gear (230) engages the ladling shaft bevel gear (430) with a backlash equal to or less than 0.008 inches.

10. The device according to claim 1, wherein the drive shaft bevel gear (230) engages the ladling shaft bevel gear (430) with a backlash equal to or less than 0.012 inches.

11. The device according to claim 1, wherein the ladler (10) is at least partially immersible in liquids.

12. The device according to claim 1, wherein the ladling unit (400) is at least partially immersible in liquids at or above 660 degrees Celsius.

13. The device according to claim 1, wherein the ladling unit (400) is at least partially immersible in liquids at 750 degrees Celsius.

14. The device according to claim 1, wherein the ladling unit (400) is fully submersible in liquids at or above 660 degrees Celsius.

15. The device according to claim 1, wherein the drive shaft bevel gear (230) is coupled to the ladling shaft bevel gear (430) with a backlash equal to or less than 0.008 inches.

16. The device according to claim 1, wherein the drive shaft bevel gear (230) is coupled to the ladling shaft bevel gear (430) with a backlash equal to or less than 0.012 inches.

17. A direct-drive robotic ladler (10), comprising:
a drive unit (100) capable of generating rotational force, coupled to a drive shaft (200) at least partially enclosed in a shaft casing (300),
coupled to a drive shaft bevel gear (230),
a ladling unit (400) having a ladling shaft (420) coupled to a ladling shaft bevel gear (430), enclosed in a ladling unit casing (405) having a plurality of external openings, wherein each opening is reversibly sealable by a sealing plate, wherein,
the drive shaft bevel gear (230) engages the ladling shaft bevel gear (430) with a backlash equal to or less than 0.008 inches, and,
rotational force generated by the drive unit (100) is mechanically transmitted to the drive shaft (200) and thence to the ladling shaft (420).

18. The device according to claim 17, wherein each sealing plate overlaps the ladling unit casing (405) external openings at all points of contact in an orthogonal, relative to a width-wise plane of said each sealing plate, width greater than a thickness of the sealing plate.

19. A direct-drive robotic ladler (10), comprising:
a drive unit (100), capable of generating rotational force, coupled by a flexible drive unit to drive shaft coupler (110) to a drive shaft (200) at least partially enclosed in a shaft casing (300), running in at least one upper shaft bearing (210) and at least one lower shaft bearing (220),
coupled to a drive shaft bevel gear (230),
a ladling unit (400) enclosed in a sealable ladling unit casing (405) having a plurality of external openings, wherein each opening is reversibly sealable by a sealing plate wherein each sealing plate overlaps the ladling unit casing (405) at all points of contact in an orthogonal, relative to a width-wise plane of said each sealing plate, width greater than a thickness of said each sealing plate,
coupled to the shaft casing (300) by at least one shaft casing—ladling unit seal (410), having a ladling shaft (420) running in at least one ladling shaft bearing (440), coupled to a ladling shaft bevel gear (430), wherein,
the drive shaft bevel gear (230) engages the ladling shaft bevel gear (430), and,
rotational force generated by the drive unit (100) is mechanically transmitted to the drive shaft (200) and thence to the ladling shaft (420).

* * * * *